United States Patent [19]

Chittenden

[11] Patent Number: 4,468,839
[45] Date of Patent: Sep. 4, 1984

[54] METHOD FOR WASHING ANIMAL CARCASSES

[75] Inventor: Jimmie A. Chittenden, Amarillo, Tex.

[73] Assignee: IBP, Inc., Dakota City, Nebr.

[21] Appl. No.: 365,411

[22] Filed: Apr. 5, 1982

Related U.S. Application Data

[63] Continuation of Ser. No. 153,798, May 27, 1980, abandoned.

[51] Int. Cl.³ ............................ B08B 3/02; A22B 5/00; A22C 17/08
[52] U.S. Cl. ............................................ 17/51; 134/36
[58] Field of Search ..................... 134/36, 100, 102; 239/432; 17/51; 366/339

[56] References Cited

U.S. PATENT DOCUMENTS

| | | | |
|---|---|---|---|
| 3,074,103 | 1/1963 | Roth et al. | 17/51 X |
| 3,194,500 | 7/1965 | Byrd | 134/36 X |
| 3,286,992 | 11/1966 | Armeniades et al. | 366/339 |
| 3,674,211 | 7/1972 | Gage et al. | 239/247 |
| 3,704,006 | 11/1972 | Grout et al. | 366/339 X |
| 4,031,006 | 6/1977 | Ramirez et al. | 210/707 |
| 4,238,244 | 12/1980 | Banks | 134/36 X |

Primary Examiner—Marc L. Caroff
Attorney, Agent, or Firm—Beveridge, DeGrandi & Kline

[57] ABSTRACT

A cleansing solution is formed by injecting a pressurized gas into a liquid, subjecting the liquid to high shear forces to divide the gas into small bubbles, and pressurizing the gas to cause a significant portion of the bubbles to become dissolved in the liquid. The cleansing solution is depressurized and applied to an animal carcass, enabling the dissolved gas to come out of solution as bubbles. The bubbles lift contaminants from the surface of the carcass by migrating outwardly from the carcass surface to the air-liquid interface.

2 Claims, 2 Drawing Figures

METHOD FOR WASHING ANIMAL CARCASSES

REFERENCE TO RELATED APPLICATION

This is a continuation of application Ser. No. 153,798 filed May 27, 1980, for Method and Apparatus for Washing Animal Carcasses, now abandoned.

BACKGROUND OF THE INVENTION

This invention relates to a method and apparatus for washing animal carcasses.

It is customary in the operation of packinghouses to wash the carcasses after certain preliminary steps such as hide removal have been performed. The purpose of the washing step is to remove blood, hair, bone dust and other contaminants that remain on the carcass after final trimming. One suitable carcass washer is disclosed in U.S. Pat. No. 3,674,211 issued July 4, 1972.

Hair is the most difficult contaminant to remove from the carcass, and it has been found that hair removal requires the use of high pressure water to provide the necessary high impact pressure. Commonly, warm water in a temperature range of about 90°–105° F. under moderately high pressures in the range of about 200 to 250 psig is sprayed on the carcass. Large quantities of water are used. The high impact pressures have been found to knock off about 1 and ¼ pounds of fat per head during carcass washing, which represents a loss to the slaughterhouse operator.

It has been found that conventional carcass washing as described above is not totally satisfactory in that significant amounts of contaminants are left on the carcass. During subsequent processing where the carcasses are fabricated into smaller pieces, further trimming is required due to such contamination, adding to the labor expense and producing an estimated loss of ½ pound of beef per head.

SUMMARY OF THE INVENTION

This invention relates to a method and apparatus for washing contaminants from animal carcasses by injecting a gas into a liquid to form bubbles in the liquid, reducing the bubble size in a mixer which exerts high shear forces on the liquid and gas, and applying the liquid to an animal carcass so the bubbles of reduced size lift contaminants from the carcass by migrating outwardly from the carcass to the ambient air. Preferably, the smaller bubbles have a size of about 10–100 microns; and, some of these bubbles are dissolved in the liquid due to pressurization which is maintained until the liquid is applied to the carcass.

This invention also relates to a method and apparatus for washing contaminants from the surfaces of animal carcasses by preparing a pressurized cleaning solution by injecting a gas into a liquid and dissolving the gas in the liquid. The cleansing solution is sprayed or otherwise applied to an animal carcass, depressurizing the solution and causing the gas to come out of solution and form bubbles which lift contaminants from the carcass surface.

Preferably but not essentially the gas is air, the liquid is water and the cleansing solution is prepared by moving liquid through a motionless mixer which is a conduit provided with oppositely-twisted stationary vanes to produce shear forces in the gas-bearing liquid. The pressurized cleansing solution has a pressure no greater than about 150 psig and it is applied to the carcass by spraying. The bubbles formed have a size in the range of about 10–100 microns.

Among the attributes of the invention are that it provides for effective removal of contaminants with a minimum consumption of liquid. The liquid may have a relatively low pressure in order to avoid undue fat loss during washing. The cleansing effectiveness of the invention also reduces the labor expenses and product losses of trimming due to inadequate washing.

Although the invention may take a wide variety of forms, the following drawings and description illustrate a preferred version thereof.

BRIEF DESCRIPTION OF A PREFERRED EMBODIMENT

Figure 1:
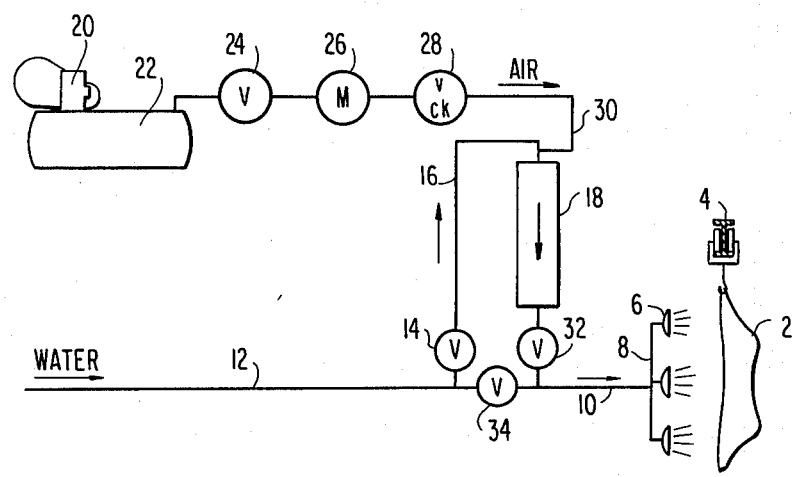
FIG. 1 is a schematic view of the system for preparing and applying the cleansing solution to animal carcasses.

FIG. 1 shows an animal carcass 2 hanging by a conventional trolley on a conveyor rail 4. Adjacent to the carcass, there are three nozzles 6 connected to a manifold 8 which receives the cleansing solution from the pipe 10. Normally, the spraying station will be considerably more complicated, and it may be of the type disclosed by U.S. Pat. No. 3,674,211 which is incorporated herein by reference.

The cleansing solution in line 10 is a liquid which preferably has a pressure no greater than about 150 psig and contains gaseous microbubbles and dissolved gas capable of forming additional microbubbles after the solution is depressurized by spraying it onto the carcass 2. This solution may be prepared by injecting air into a flowing stream of water, subjecting the water-air stream to very high shear forces so that the bubbles of gas will be divided into smaller bubbles in the size range of about 10–100 microns, and, in addition, pressurizing the liquid so dissolution of a portion of the gas in the liquid will occur. As shown in FIG. 1, the water is introduced by pipe 12, through valve 14 and pipe 16 to the infeed end of a motionless mixer 18, the details of which are discussed below in connection with FIG. 2.

Air is pressurized by a compressor 20, the outlet of which is connected to an air tank 22 and fed through a cutoff valve 24, a meter 26 which is calibrated in cubic feet per minute and a check valve 28. The air then moves through a pipe 30 to a point in water pipe 16 which lies immediately upstream of the motionless mixer 18.

Within the motionless mixer, the liquid which contains bubbles of the injected gas is subjected to high shear forces, preferably due to the presence of oppositely-inclined stationary vanes in the mixer 18. This divides the gas into small bubbles, a major portion of which are in the 10–100 micron size range. Due to pressurization and the small bubble size, a substantial amount of the injected gas becomes dissolved in the liquid. From the mixer 18, the liquid and gas move through valve 32 into the pipe 10 of the spraying apparatus. A normally closed bypass valve 34 may be opened if there is occasion to bypass the air-injection and mixing components of the apparatus, in which case valves 14 and 32 will be closed.

Figure 2:
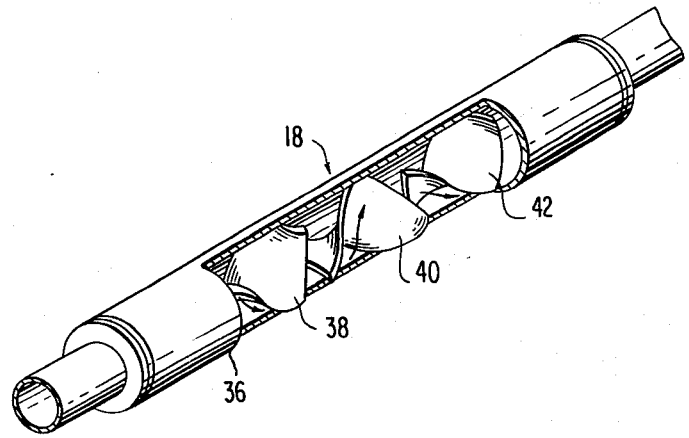
FIG. 2 shows a motionless mixer of the type preferred for preparing the cleansing solution.

The preferred motionless mixer 18 is shown in FIG. 2 where one wall thereof has been broken open for illustrative purposes. The mixer 18 includes a conduit 36 provided with a set of stationary internal vanes, three of which are shown at 38, 40 and 42. These vanes split and twist the flow, producing shear forces in the gas-containing liquid stream passing through the mixer. Preferably, the vane 40 is twisted in an opposite direction to the vanes 38 and 42 in order to move the stream alternately in a left-hand helical path and a right-hand helical path as it moves through the mixer. Also, it is preferred that the downstream edge of each vane be angularly displaced from the upstream edge of the succeeding vane so that the flow is split as well as being counter-rotated. Motionless mixers are disclosed and discussed in greater detail in U.S. Pat. Nos. 3,286,992, 3,664,638 and 3,704,006 and the use of such mixers to produce an aerated liquid in dissolved air flotation apparatus is disclosed in U.S. Pat. No. 4,031,006.

The cleansing solution, when released by nozzles 6 moves from a pressurized area where it contains small bubbles in the 10–100 micron size range and some gas in solution to a depressurized area on the carcass surface. When depressurized, the dissolved gas comes out of solution as small bubbles which also are in the 10–100 micron size range. The bubbles in the cleansing solution lift the contaminants from the surface of the carcass by migrating outwardly from the carcass surface to the ambient air. This effect is similar to the cleansing of a wound with an effervescent solution such as hydrogen peroxide.

From the foregoing, it will be appreciated that this invention offers an uncomplicated but potentially effective method and apparatus for cleansing animal carcasses. It is believed that this system will reduce water consumption, increase cleansing efficacy, reduce labor costs and reduce product losses which occur when spraying with higher pressures and when trimming contaminated meat.

Persons familiar with this art will appreciate that the invention may be performed by a wide variety of systems other than the one specifically disclosed hereinabove. Therefore, it is emphasized that the invention is not limited to the sole disclosed embodiment but is embracing of a wide variety of methods and apparatuses which fall within the spirit of the following claims.

I claim:

1. A method of washing contaminants from the surface of an animal carcass, comprising the steps of:

injecting a gas into a liquid to form bubbles in the liquid, reducing the size of the bubbles by passing the bubble-containing liquid through a mixer which subjects the liquid and gas to high shear forces to divide the bubbles and reduce them to a size of about 10–100 microns, said liquid being pressurized and said bubbles having sizes such that a substantial amount of the gas becomes dissolved in the liquid, spraying the liquid onto an animal carcass, said liquid being depressurized when applied to the carcass to cause the dissolved bubbles to come out of solution.

lifting contaminants from the surface of the carcass, said lifting step being performed by said bubbles of reduced size after the liquid has been applied to the carcass, said bubbles migrating outwardly from the carcass to the ambient air to lift contaminants from the surface of the carcass.

2. The method of claim 1 wherein the step of reducing the size of the bubbles is performed by passing the bubble-containing liquid longitudinally through a conduit having stationary vanes therein which are oppositely twisted about the axis of the conduit.

* * * * *